(12) United States Patent
Rossmann et al.

(10) Patent No.: US 6,526,439 B1
(45) Date of Patent: *Feb. 25, 2003

(54) METHOD AND APPARATUS FOR ACCELERATING NAVIGATION OF HYPERTEXT PAGES USING COMPOUND REQUESTS

(75) Inventors: Alain S. Rossmann, Palo Alto, CA (US); Andrew L. Laursen, San Mateo, CA (US); Bruce K. Martin, Palo Alto, CA (US)

(73) Assignee: Openwave Systems Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/539,186

(22) Filed: Mar. 30, 2000

(51) Int. Cl.[7] ............................................... G06F 15/16
(52) U.S. Cl. ..................... 709/219; 709/217; 709/203; 709/304
(58) Field of Search ................................. 709/219, 203, 709/304, 200, 217

(56) References Cited

U.S. PATENT DOCUMENTS

| | | |
|---|---|---|
| 5,247,676 A | 9/1993 | Ozur et al. |
| 5,491,745 A | 2/1996 | Roeder |
| 5,581,595 A | 12/1996 | Iwashita et al. |
| 5,608,786 A | 3/1997 | Gordon |
| 5,623,605 A | 4/1997 | Keshav et al. |
| 5,675,507 A | 10/1997 | Bobo, II |
| 5,708,780 A | 1/1998 | Levergood et al. |
| 5,727,048 A | 3/1998 | Hiroshima et al. |
| 5,727,159 A | 3/1998 | Kikinis |
| 5,801,702 A | 9/1998 | Dolan et al. |
| 5,898,462 A | 4/1999 | Harrison et al. |
| 5,923,736 A | 7/1999 | Shachar |
| 6,199,107 B1 * | 3/2001 | Dujari ........................ 709/219 |
| 6,393,467 B1 * | 5/2002 | Potvin ........................ 709/203 |
| 2002/0068554 A1 * | 6/2002 | Dusse ........................ 455/419 |

OTHER PUBLICATIONS

Janet Perry, On TheInternet: An International Publication of the Internet Society, On the Net, Through the Air, in your hands: Cellular Technology and the Future of the Internet, 3 pages Jul./Aug. 1997.
Peter King et al., ed., Handheld Device Markup Language Specification, May 9, 1997, 35 pages www.w3.org/TR1.
"HDML Quick Reference", Allaire Corp., 8 pp., www2.allaire.com/documents/, Dec. 1997.
"Introduction to HDML Structure and Syntax", Allaire Corp., 17 pages, www.home–sitenow.com/documents/, Dec. 1997.
"HDTP Specification," Unwired Planet, Inc., Version 1.1, Part No. HDTP–SPEC–DOC–101, Jul. 15, 1997, pp. 1–40.
"HDML 2.0 Language Reference," Unwired Planet, Inc., Version 2.0, Part No. HDMLREF–DOC–200, Revision D, Jul. 1997, pp. 1–56.

* cited by examiner

Primary Examiner—Ayaz Sheikh
Assistant Examiner—Shabana Qureshi
(74) Attorney, Agent, or Firm—Blakely, Sokoloff, Taylor & Zafman LLP

(57) ABSTRACT

Under the limited bandwidth of the current wireless data network and with the low memory in mobile devices in use today, the process of going through a number of intermediate pages to get to a desired page increases the latency of the information deliver and intensifies the network traffic. A method for accelerating the navigation of hypertext pages based on a compound request is disclosed. After a compound request is entered and activated, the compound request is parsed into an antecedent request followed by a final request wherein the antecedent request comprises a plurality of intermediate requests. All the intermediate requests are processed individually and sequentially as if they were entered individually and cards corresponding to the intermediate requests are fetched sequentially. A final card containing desired information by the final request is fetched based on the card corresponding to the last intermediate request and thereby displayed.

29 Claims, 10 Drawing Sheets

METHOD AND APPARATUS FOR ACCELERATING NAVIGATION OF HYPERTEXT PAGES USING COMPOUND REQUESTS

CROSS-REFERENCE TO RELATED APPLICATION

The present application is continuation-in-part of application Ser. No. 08/570,210, filed Dec. 11, 1995 noe U.S. Pat. No. 5,809,415, entitled "A Method and Architecture for An Interactive Two-way Data Communication Network" by Alain S. Rossmann, one of the inventors hereof. This copending application is incorporated herein by reference.

BACKGROUND OF THE INVENTION

1. Field of Invention

This invention relates generally to data communications, and in particular to two-way data communication devices, including a mobile computing device, a mobile device, a landline telephone, and an Internet appliance controller, that permit a user to interface and interact with a server over a data network.

2. Description of the Related Art

The Internet is a rapidly growing communication network of interconnected computers and computer networks around the world. Together, these millions of connected computers form a vast repository of hyperlinked information that is readily accessible by any of the connected computers from anywhere at any time. To provide mobility and portability, wireless Internet computing devices were introduced and are capable of communicating, via wireless data networks, with the computers on the Internet. With the wireless data networks, people, as they travel or move about, are able to perform, through the wireless computing devices, exactly the same tasks they could do with computers on the Internet.

The most common remote access paradigm is, as of today, the one in which a laptop personal computer is equipped with a wireless communication mechanism such as a wireless modem. This paradigm may remain useful for a considerable number of mobile applications and users that are willing to tote a laptop personal computer. However, there has been a growing need for a mobile paradigm in which the Internet can be instantly accessed by smaller mobile devices, such as mobile phones and personal digital assistants (PDA). The smaller mobile devices are generally designed very small in size and light in weight. With increasing data processing capabilities, more and more users are carrying such devices around to materialize their unproductive time into productive time.

Regular mobile phones can return calls, check voice mail or enable users to be available for teleconferences anywhere at any time. However, new mobile phones are desired that are not just reactive to calls but also are proactive. For example, an ideal mobile phone would meld voice, data, and PDA functionality into a single handset that can effectively, through a host computer, access a myriad of public and enterprise information services in the Internet. The evolution of the mobile phones or other mobile computing devices has been evidently fueled by the demand of users for immediate access to the information they are looking for in the Internet. For example, a traveler may request the departure time of a next available flight when on the way to an airport, or a trader may purchase shares of stock at a certain price. The pertinent information from these requests or transactions may include the airline and the flight number for the traveler, as well as the stock name, the number of shares and the price being purchased for the trader. To be timely and regularly informed, a preferable way is to electronically communicate the information requests using a wireless data network. The wireless data network, for example, connects to a flight information server or stock quote server so that the desired flight information or the current stock price can be retrieved therefrom on demand.

To increase portability and mobility, most mobile devices are designed small in size, light in weight, low in power consumption, and as economical and portable as possible. However, such mobile computing devices with such thin designs often have very limited computing resources. For example, the computing power of a mobile computing device may be equivalent to less than one percent of what is provided in a typical desktop or portable personal computer. Furthermore, the memory capacity of mobile computing devices are generally less than 250 kilobytes and their LCD display is perhaps four lines high by twelve or twenty characters and their graphics capabilities are very limited or nearly nonexistent. Finally, the input interface on mobile computing devices is often a keypad that has far fewer buttons than a PC keyboard does or a stylus and digitizer. These design constraints generally seen in a mobile device make Internet navigation noticeably difficult. For example, it is quite laborious to enter a long alphanumeric Universal Resource Locator (URL) to access a specified service using the phone keypad. Nevertheless, there have been many efforts to provide efficient user input mechanisms through a phone keypad. For example, one common practice is to provide multifunction for the numerical keys in the phone keypad wherein each of the numerical keys or numbered buttons represents two or three letters in the English alphabets, such that a desired letter is obtained by repeatedly stroking a corresponding numerical key.

Another method is the use of a prediction mechanism based on the common usage of 20 words to minimize keystrokes. For example, "e" may be automatically entered when a user keys in "th". A popular adopted method in the Internet navigation in a mobile device is to provide a mechanism to predefine a set of URLs of frequently visited Web sites, each associated with a numeral. Therefore, merely pressing a specified numeral key leads to a corresponding Web site. However, many Web sites provide hierarchical layers or pages of information services, so that navigating through the hierarchical Web site often demands further key stroking to reach a particular page through a number of intermediate pages. Under the limited bandwidth of the current wireless data network and with the low memory in the mobile devices, the process of going via the intermediate pages slows information transmission speed and intensifies the network traffic. Therefore, there is a great need for an efficient mechanism that brings to the desired page without physically waiting for the delivery of every intermediate page in order to move onto the next page. There is a further need for a mechanism for thin devices to reach a desired page without intensifying network traffic. When some Web sites provide hierarchical layers of information in different languages, navigating page by page to a desired page based on a hyperlink in intermediate pages can be difficult for users who may only understand a particular language. There is thus still a further need for a way to a compound request to arrive at a desired page without following up all the intermediate pages.

SUMMARY OF THE INVENTION

The present invention has been made in consideration of the above described problems and has particular applications to the navigation of Internet web pages using thin devices, such as a mobile computing device, a mobile device, a landline telephone, and an Internet appliance controller. Under the limited bandwidth of the current wireless data network and the low computing resources available in the thin devices, navigating hierarchical layers of accessible information based on a compound request yields unexpected results. The compound request generally comprises an antecedent request and a final request wherein the antecedent request comprises a sequence of intermediate requests. Users of the thin devices can now arrive at a desired page designated by the final request with only one compound request without having to follow up all intermediate pages respectively designated by the intermediate requests. The intermediate requests are parsed and processed internally either in the thin devices or at a server site, which increases significantly the delivery speed of the desired information and reduces dramatically the network traffic.

According to one embodiment, the present invention is a method for accelerating navigation of hierarchical layers of accessible information hosted in a server device through a two-way interactive communication device over a data network, the method comprising:

displaying a menu comprising a plurality of items, each having an address identifier;

receiving a compound request entered by a user of the two-way interactive communication device to display desired information;

parsing the compound request to obtain an antecedent request and a final request;

processing the antecedent request and the final request; and displaying the desired information.

Accordingly, an important object of the present invention is to provide a method for accelerating navigation of hypertext pages in the Internet based upon a compound request from mobile devices.

Other objects, together with the forgoing are attained in the exercise of the invention in the following description and resulting in the embodiment illustrated in the accompanying drawings.

DETAILED DESCRIPTION OF THE INVENTION

Notation and Nomenclature

In the following detailed description of the present invention, numerous specific details are set forth in order to provide a through understanding of the present invention. However, it will become obvious to those skilled in the art that the present invention may be practiced without these specific details. In other instances, well known methods, procedures, components, and circuitry have not been described in detail to avoid obscuring aspects of the present invention.

The detailed description of the present invention in the following are presented largely in terms of procedures, steps, logic blocks, processing, and other symbolic representations that resemble of data processing devices coupled to networks. These process descriptions and representations are the means used by those experienced or skilled in the art to most effectively convey the substance of their work to others skilled in the art. The present invention is a method for accelerating navigation of hypertext pages over a data network based on a compound request from a two-way communication device. The method to be described in detail below is a self-consistent sequence of processes or steps leading to a desired result. These steps or processes are those requiring physical manipulations of physical quantities. Usually, though not necessarily, these quantities may take the form of electrical signals capable of being stored, transferred, combined, compared, displayed and otherwise manipulated in a computer system or electronic computing devices. It proves convenient at times, principally for reasons of common usage, to refer to these signals as bits, values, elements, symbols, operations, messages, terms, numbers, or the like. It should be borne in mind that all of these similar terms are to be associated with the appropriate physical quantities and are merely convenient labels applied to these quantities. Unless specifically stated otherwise as apparent from the following description, it is appreciated that throughout the present invention, discussions utilizing terms such as "processing" or "computing" or "verifying" or "displaying" or the like, refer to the actions and processes of a computing device that manipulates and transforms data represented as physical quantities within the computing device's registers and memories into other data similarly represented as physical quantities within the computing device or other electronic devices.

The Preferred Embodiment

Figure 1:
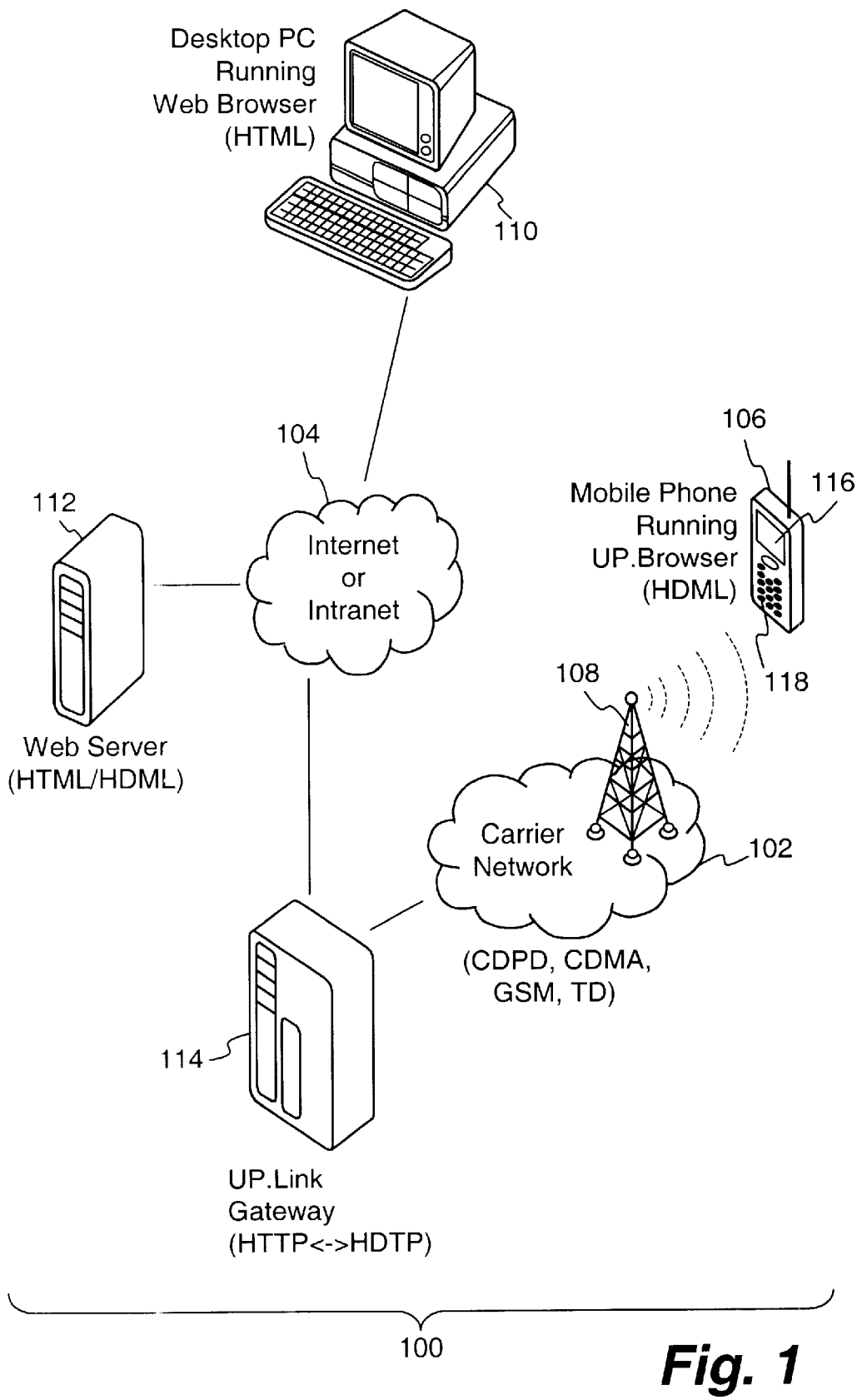
FIG. 1 illustrates one data network in which the present invention may be practiced.

Referring now to the drawings, in which like numerals refer to like parts throughout the several views. FIG. 1 shows a schematic representation of a data network 100 in which the present invention may be practiced. The data network 100 comprises an airnet 102 that is generally called wireless network and a landnet 104 that is generally a landline network, each acting as a communication medium for data transmission therethrough. The airnet 102, in which the data transmission is via electromagnetic radiation carried through the airwaves, is sometimes also referred to as a carrier network because each airnet is controlled and operated by a carrier such as AT&T or GTE. Each carrier may have its own communication scheme, such as CDPD and Code Division Multiple Access (CDMA), for the airnet 102. The landnet 104 (sometimes referred to in this document as the Internet) may be the global Internet, an Intranet, or other public or private network. A two-way communication device 116, resembling a mobile device therein, can be a mobile computing device, a mobile device, a cellular phone, a landline telephone, or an Internet appliance controller, capable of communicating with the airnet 102 via an antenna 108. It is generally understood that the airnet 102 simultaneously carriers the communication of a plurality of two-way communication devices, of which only one mobile device 106 is shown in FIG. 1.

Similarly, connected to the Internet 104 are a plurality of desktop personal computers (PCs) 110 and a plurality of server computers 112, though only one representative respectively shown in the figure. The PC 110, as shown in the figure, may be a personal computer SPL 300 from NEC Technologies Inc. and runs a HyperText Markup Language (HTML) or a Handheld Device Markup Language (HDML) Web browser. The browser access information via the Internet 104 using HyperText Transfer Protocol (HTTP) or Handheld Device Transport Protocol (HDTP) to access information stored in the web server 112 that may be a workstation from Sun Microsystems Inc. It is understood to those skilled in the art that the PC 110 can store accessible information therein so as to become a web server as well. Between the Internet 104 and the airnet 102 is a link server 114 that communicates data therebetween. The link server 114, also referred to as proxy server or gateway, may be a workstation or a personal computer and performs mapping or translation functions. For example, the link server 114 may perform communication protocol mapping from one protocol to another, thus a mobile device 106 can be in communication with any one of the servers 112 or the PCs 110, respectively.

One well-known communication protocol used by the Internet 104 is the Hypertext Transfer Protocol (HTTP) that runs on the Transmission Control Protocol (TCP). HTTP is used to provide the connection of an HTML Web browser to a Web server and exchange information therebetween. In one embodiment, the communication protocol between the mobile device 106 and the link server 114 via the airnet 102 is Handheld Device Transport Protocol (HDTP), or Secure Uplink Gateway Protocol (SUGP), which preferably runs on User Datagram Protocol (UDP) and controls the connection of an HDML Web browser to a link server, where HDML stands for Handheld Device Markup Language. HDML, similar to that of HTML, is a tag based document language and comprises a set of commands or statements specified in a card that specifies how information is displayed on a small screen of the mobile device 106. Normally a number of cards are grouped into a deck that is the smallest unit of HDML information that can be exchanged between the mobile device 106 and the link server 114. More description on the HDML cards and deck will be described below wherever appropriate. The specifications of HDTP, entitled "HDTP Specification" and HDML, entitled "HDML 2.0 Language Reference" are enclosed and incorporated herein by reference in its entirety.

The HDTP is a session-level protocol that resembles the HTTP but without incurring the overhead thereof and is highly optimized for use in thin devices that have significantly less computing power and memory. Furthermore, it is understood to those skilled in the art that UDP does not require a connection to be established between a client and a server before information can be exchanged as is the case with TCP. Thus, using UDP eliminates the need of exchanging a large number of packets during a session creation between a client and a server. Exchanging a very small number of packets during a transaction is one of the desired features for a mobile device with very limited computing power and memory to effectively interact with a landline device.

The link server 114, as the name suggests, links the airnet 102 to the landnet 104. Nevertheless, it can be appreciated that the link server 114 can function as a web server as well, providing information service directly to the mobile devices that are in communication with the link server 114 using HDTP. Being coupled to the landnet 104 using HTTP, the link server 114 can further provide information service to the PCs 100 or the workstations 112 and equally fetch information therefrom. Therefore in the following description, the link server or a web server is indistinguishably used to mean a server device that primarily provides information service to one or more mobile devices.

Figure 2:
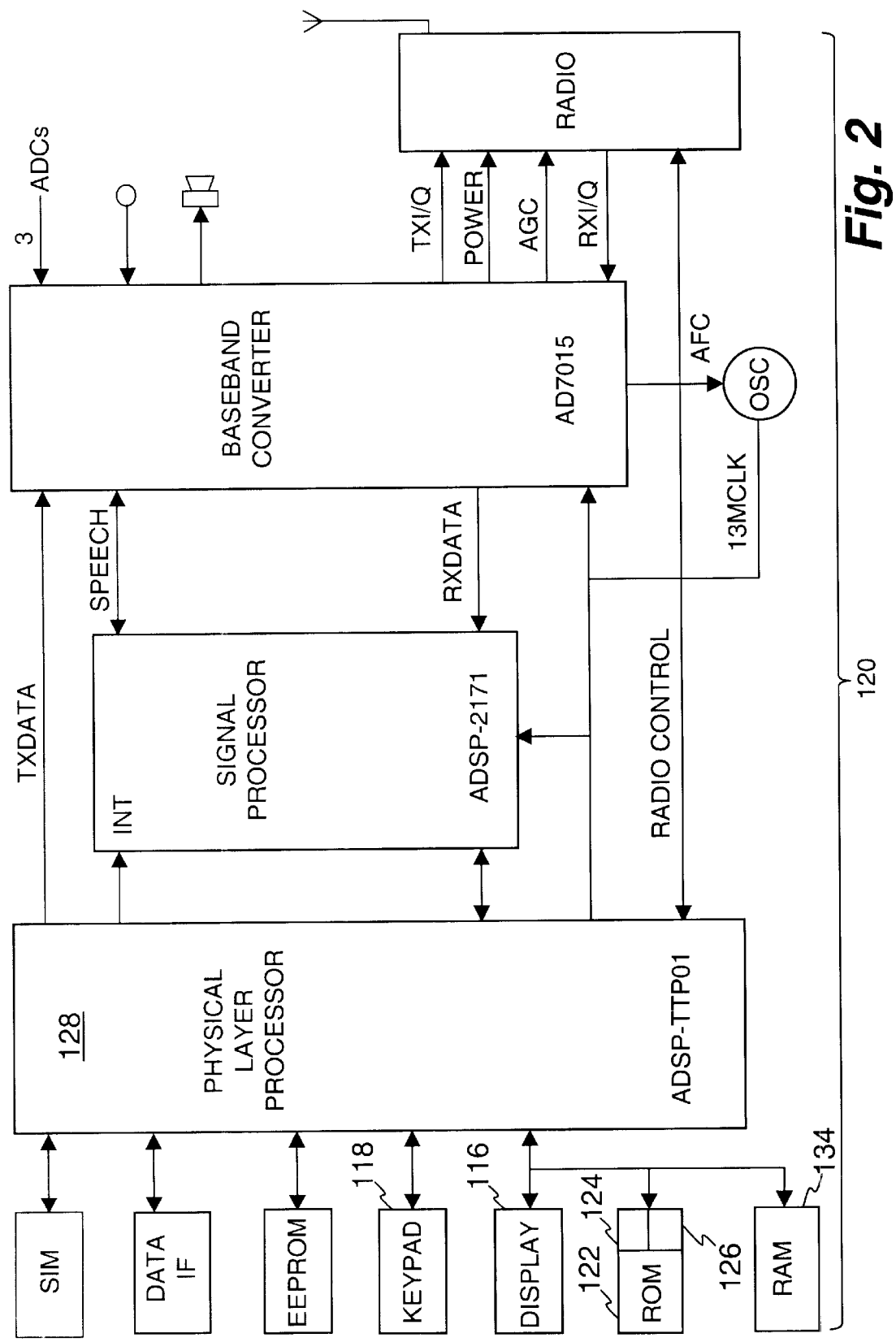
FIG. 2 shows a block diagram of a typical digital mobile device that can be used in the data network of FIG. 1 to practice the present invention.

FIG. 2 illustrates a block diagram of a typical digital mobile phone 120 that can be used in the arrangement of FIG. 1 to practice the present invention. Each of the hardware components in the mobile phone 120 is known to those skilled in the art and so the hardware components are not described in detail herein. With the screen 116 and the keypad 118, a user of the phone 120 can interactively communicate with a server device (not shown in FIG. 2) over a wireless data network.

According to one embodiment, compiled and linked processes of the present invention are stored in ROM 122 as a client module 124 and a support module 126. Upon activation of a predetermined key sequence utilizing the keypad 118, a physical layer processor or microcontroller 128 initiates a communication session request to the server device using the module 124 in the ROM 122. Upon establishing the communication session, the phone 120 typically receives a single HDML deck from the server device and stores the deck as cached in RAM 134. An HDML deck or deck is the smallest unit of HDML information that can be exchanged between a thin client device and a server device. Each deck has a unique address identifier such as a URL and includes one or more cards. A card includes the information required to generate a screen display on the display screen 116. Thus, a deck is simply a group of screen displays. The number of cards in a card deck is selected to facilitate efficient use of the resources in the mobile device and in the airnet network. A display driver 130 receives and interprets information from the deck in the RAM and causes the screen 116 to display the information accordingly. The keypad driver 132 receives signals representing what buttons or keys in the keypad are depressed and converts the signals to a representation understood by the microcontroller 128. The microcontroller 128 may respond by activating a respective card in the deck or accessing new deck by requesting the server for a new deck if necessary depending on what choice is made through the phone keypad 118.

The phone keypad 118 comprises, preferably, a typical phone keypad and a pair of generic buttons and at least a pair of upward and downward arrow buttons. The typical phone keypad, as commonly seen, comprises twelve buttons. Of the twelve buttons, ten buttons are consecutively numbered, each for one of the numerals 0 to 9, respectively, one button is for "*" sign and the other button is for "#" sign. The four extended buttons, the generic and the arrow buttons, although not necessary in practicing the present invention, provide convenient means for a user to interact with the phone 120.

Figure 3:
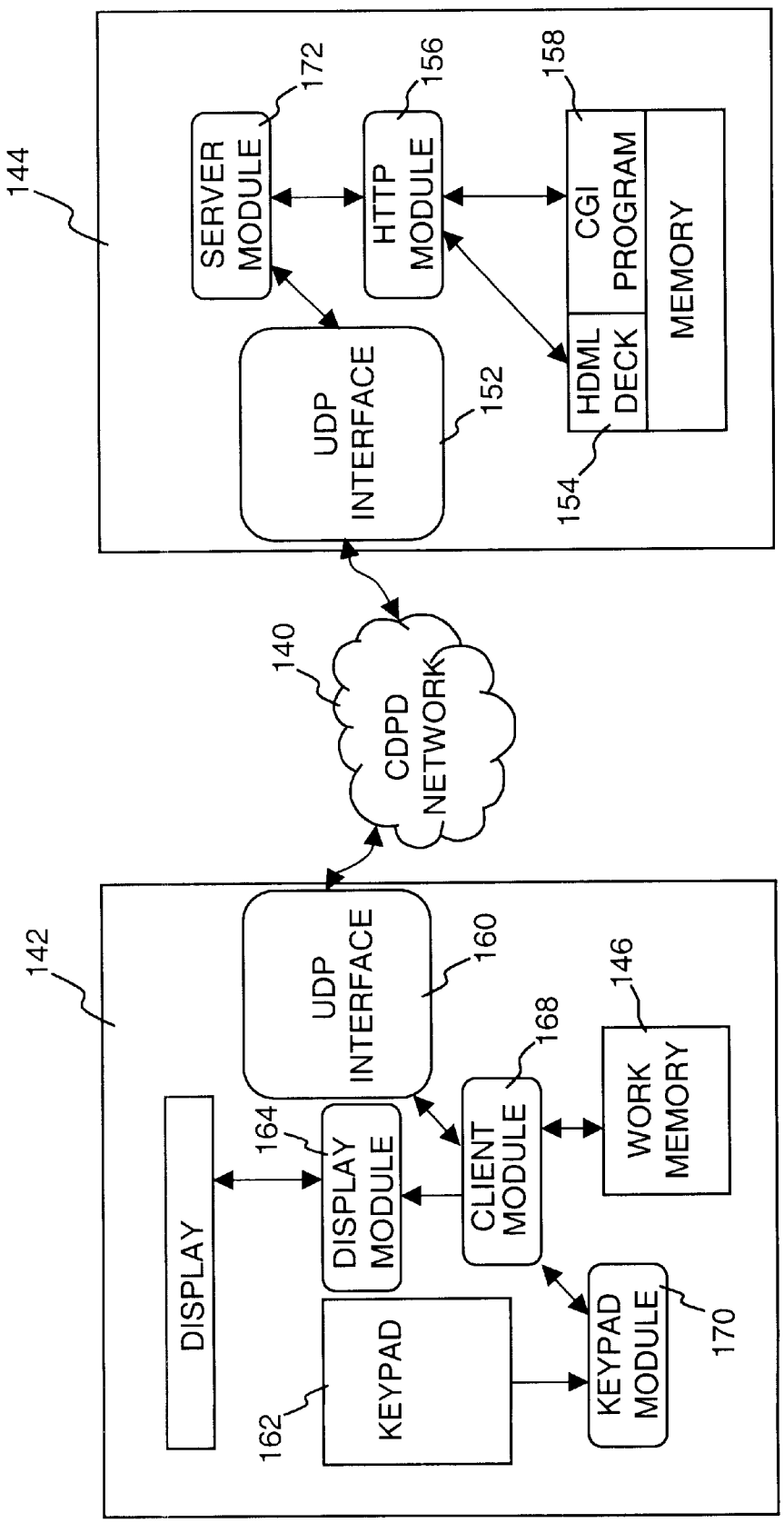
FIG. 3 depicts an architecture of a mobile device in communication with a server device over a cellular digital packet data (CDPD) network.

FIG. 3 shows the architecture of a mobile device 142 in communication with a server device 144 over a data network 140. The mobile device 142 is a two-way communication device that may be the digital phone 120 of FIG. 2, a mobile computing device, a landline telephone and an Internet appliance controller. In FIG. 3 various components in one embodiment of this invention of the mobile device 142 are shown. Those skilled in the art will appreciate that the mobile device 142 includes circuitry and software similar to that illustrated in the mobile device 120 for voice and data operations. Similarly, the server device 144 includes other processes and hardware that are known to those skilled in the art and are not illustrated in detail in the figure for clarity.

In this embodiment, the client module 146 in the mobile device 142 communicates with the server device 144 over a mobile digital packet data (CDPD) network 140. The mobile digital packet data network 140 is used to illustrate one embodiment of this invention on one two-way data communication network. The principles of this invention can be used with a wide variety of two-way data communication networks. For example other two-way data communication networks for mobile telephones that may be used include TDMA, CDMA, and GSM circuit switched data networks; and the AMPS analog mobile network with a modem. Prior to considering the operation of this configuration in FIG. 3 in more detail, a technique for conveying instructions from the mobile device 142 to a server application on the server device 144 or vice versa is necessarily to be described herein.

After a predefined key in the keypad 162 is pressed, the keypad module 170 causes the client module 168 to send a request to establish a connection, via the UDP interface 160, with server device 144. The request generally comprises a URL identifying the server with which the client module 168 intends to exchange pertinent information. The server can be the server device 144 or any computers on the Internet. The following description is based on the assumption that the intended server is the server device 144. Those skilled in the art will understand that the description is equally applied when the intended server is other than the server device 144.

As described before, information or instructions are grouped into one or more HDML cards required to generate a screen display. A deck includes one or more such cards. Additional information about cards and decks can be found in the "HDML Language Reference, Version 2.0." As used herein, a screen display is the contents presented on the display screen that is the physical display apparatus such as a 4 lines by 20 characters LCD screen. For simplicity, in this embodiment, each deck is a single operation wherein an operation is defined as a related set of actions such that the user does not encounter an unanticipated delay in moving from one action t the next, i.e. the user does not have to wait for client module 146 to retrieve another deck from the server device 144. Further, a card may include definitions of soft keys that stay in force while the card is active, i.e., commands are represented by the soft keys can be executed by the mobile device microcontroller, preferably through a pair of generic buttons in the extended phone keypad. To provide information service to mobile devices, the server device 144 stores a plurality of decks 154 containing accessible information. The server device 144 further generates HDML decks along with CGI program 158, in response to data from or choices made by the user of the mobile device 142.

According to one embodiment of the present invention, the server device 144 fetches corresponding decks from stored HDML decks 154 in response to the request from the mobile device 142. The server module 172 then transforms or compresses the correspond decks to a compiled version of HDML referred to as HDMLC, formerly known as terminal interaction language (TIL). HDML was formerly known as phone interaction description language (PIDL). Through the use of the UDP interface 152, the server module 172 sends the compiled HDML decks or HDMLC decks to the mobile device 142 using HTTP. HDML cards, like HTML files, are readable by humans while HDMLC cards are binary data and much smaller in terms of file size, applicable for transmission via a wireless network 140. Furthermore, HDMLC cards allow easy parsing in the mobile device 142 environment.

The compression from HDML cards or decks to HDMLC is done typically at run time, namely only the selected HDML cards are compressed when they are to be sent to the mobile device 142. It is known, however, that there are a wide variety of techniques that can be used to convert HDML cards or decks to a compressed version. For example, the verbs in the PIDL language are compressed using a binary tokenization, graphics are compressed using run length encoding compression, and text is compressed using any one of the well-known techniques for text compression. The important aspect is that if the bandwidth across the wireless network 140 is limited, a compressed form of the selected HDML cards or decks is preferably used. In addition, a each data type, preferably is compressed to facilitate optimal transfer over the network 140. Nevertheless, it should be understood that the compression of HDML cards or decks is not required to implement this invention, compression makes the invention more efficient by utilizing the bandwidth of the network more effectively.

The server device 144 uses UDP interface module 152 to send data to and receive data from the CDPD network 140. HDML decks 154 are the decks that can be accessed by the HTTP module 156. It should be noted that the decks are accessible by the HTTP module 156 using HTTP when the decks are physically loaded in another server on the internet to which the server device 144 is coupled. In this case, the selected HDML cards or decks are fetched to the HTTP module 156 and then compressed by the server module 172 that subsequently sends the compressed version, namely HDMLC, to the mobile device 142.

As indicated above, each interaction with the user of the mobile device 142 is described by a deck or a series of decks. Logically, the user retrieves an HDML deck stored in the memory 148 of the mobile device 142 after receipt from the server device 144 over the CDPD network 140. The user reviews the information displayed by cards in the deck and makes choices and/or enters requested information and then requests another deck.

A "deck" is the smallest unit of HDML information that can be exchanged with the server device. Each deck has a unique address identifier such as a URL. A user may navigate from one deck to another by traversing hyperlinks that reference a desired deck. According to one embodiment, the received deck or decks are normally kept in the work memory 148 of the phone 142 in FIG. 3. Upon receiving a request from the user, the client module in the mobile device 142 first consults the work memory 148 therein to determine if the requested deck is available. If the received request is met by one the cards in the received deck, the deck or the corresponding card in the deck is accessed without requiring any communication with the server device. If the received request can not be satisfied by one of the cards in the received deck, which means the request has to be satisfied in a new deck, a connection initiated by the client module 146 to the server device 144 is made to fetch the new deck. FIGS. 4A through 4G show the processing of the navigation requests, fetching requested information from a corresponding web service server and forwarding the information subsequently to the phone 142. This is discussed in more detail below.

Regarding the cards used in the embodiment, there are four types of cards, an entry card, a display card, a choice card, and a no-display card. Regardless of the types, a card can contain text and images. In addition, the invention is not limited to these particular types of cards. The definition of the particular types of cards is used to facilitate a description of the invention and to assist developers in organizing applications. To be more specific, a display card gives information to display to the user. The displayed content can include any one of, or any combination of text, an image, and one or more soft keys. A choice card displays a list of choices for the user. The choices are automatically presented in a format specified on the choice card and generally numbered accordingly. As explained above, the user makes a choice by depressing a key corresponding to the choice. An entry card is used to obtain input data from the user. An entry card displays one or more entry lines. Typically, each entry line includes a display followed by an entry line. The entry line, in this embodiment, can be for either numeric or text data. A no-display card is a hidden card not for the purpose of being displayed. The no-display card is normally used to execute an intermediate action and generally not known to a user.

In this embodiment, choice and entry cards prevent the user from moving to the next card until the user has entered the requested information. When the user reaches the last card in a deck and hits a corresponding soft key, a request for a new deck is initiated. The deck requested is determined by either the deck that the user has completed, or by the choices made by the user. When the deck is completed, the choices and/or data entered by the user are typically transmitted along with the request to a server device for a new deck. When a deck containing multiple cards is received and stored in the cache memory, the client module in the phone fetches the first card in the deck and displays the information in the card on the screen of the phone and allows the user to respond thereto. Depending on the card type, the user responds by entering text or choosing an option, and then pressing a predetermined key to transact the response.

Figure 4A:
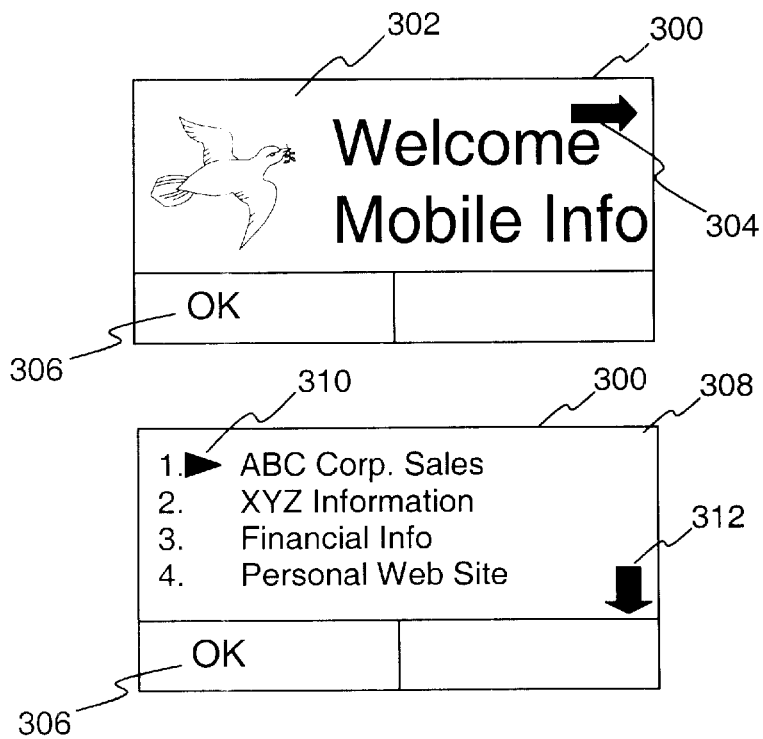
FIGS. 4A to 4G are illustrations of a series of screen displays of the mobile device in communication with the server device hosting an information web service.

Upon establishing a communication session between the mobile device 142 and the server device 144, an initial deck transmitted to the mobile device 142 includes an introductory display card and a choice card. FIG. 4A is an example of introductory screen display 302 that is generated on a display screen 300 by the client module in mobile device 142 by interpreting the display card. In this embodiment, the display screen 300 is a pixel display that displays a graphic image. In another embodiment, display screen 300 displays only text and so the graphics would not appear on display screen 300. Screen display 302, and other screen displays described more completely below, include a horizontal arrow 304, i.e., a multi-card deck indicator, to communicate to the user that the current deck includes another card. The inclusion of screen indicators, such as the multi-card deck indicator, to communicate with the user is optional. The functionality of this invention is independent of such screen indicators. Referenced by 306 is a soft key generally associated with one of the generic buttons in the keypad of the mobile device 142. The soft key provides a mechanism to map the generic button into a specified button, namely to press the generic button is equivalent to press an "OK" button when the soft key OK is displayed. Again, the functionality of this invention is independent of such soft keys.

Figure 4B:
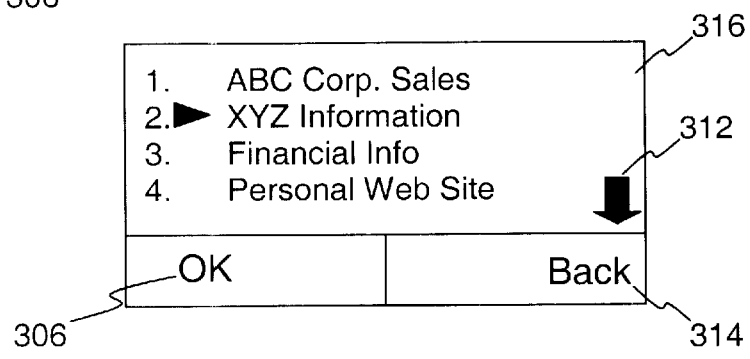

When the user depresses a predetermined key, i.e. one of the generic buttons in this case, with respect to the soft key, the client module 146 in the mobile device 142 interprets the next card in the card deck and in turn generates a menu 308, as shown in FIG. 4B, including a number of items that can be accessed by the user. A multi-display screen card indicator 312, e.g., in this embodiment, a downward arrow, shows that the screen display associated with the current choice card includes additional items that are not shown on display screen 300. Herein, a screen display can be larger than the number of lines available on the display screen 300 and so the user must scroll the screen display to view the complete screen. Thus, to view the additional items, the user presses the downward arrow key corresponding to the multi-display screen card indicator 312 on the display screen 300. In this embodiment, when the downward arrow key is pressed, each line of the display is rolled up one line. The resulting display has an icon with an upward arrow (not shown) if the menu requires only two screen displays. If the menu requires more than two screen displays, the second screen display of the menu would have two icons, one with the upward arrow and another with the downward arrow. To scroll between the various lines in the second menu, the user uses the downward arrow key, and the upward arrow key. If the user displays the last line of a card, e.g., the last line in the second menu, and presses the downward arrow key nothing would happen because the downward arrow icon, another soft key, will not be present. In this embodiment, the user must make a choice before the next card is available.

In this embodiment, each of the menu items is available on the server device 144 or distributed on several server computers in a data network. As explained more completely below, each of the menu items is associated with a numeral that corresponds to a resource locator in the card containing the menu items. The resource locator includes an address of the particular object associated with that menu item. In general, a resource locator includes a URL and may include appended data. The address can be to another card in the deck stored in the cache or to a remote object on a server computer. As shown in FIG. 4B, the first item in the menu 308 is initially indicated by an arrow 310 as a pre-chosen item. If the user decides to proceed with the pre-chosen item, the soft key "OK" may be pressed, or simply press a numbered button "1", i.e. one of the 10 numbered buttons, to cause the client module 146 in the phone 142 to activate and interpret a card specified by the address associated with the item. If the pre-chosen item is not a wanted one, the user may scroll the choice arrow 310 downward. It should be noted that scrolling to a selected item is a feature that is specific to this example, and in general is not required to implement the invention. Other methods can be used to indicate the user's choice on display screen 300 such as a horizontal highlighting strip overshadowing the choice, if such an indication is desired. As described above, the user may simply key in one or more numerals to select an item that is of interest.

Figure 4C:
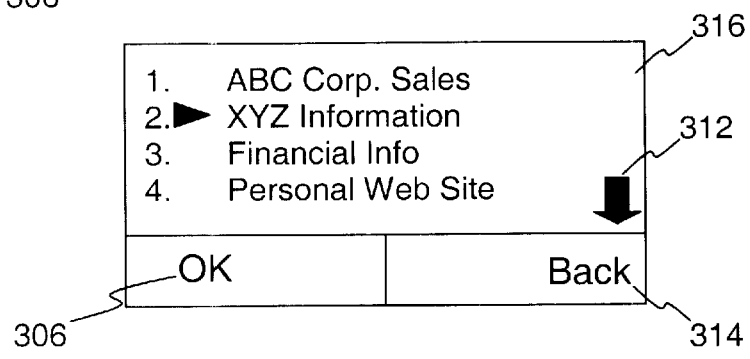

As shown in FIG. 4C, the user moves the arrow 310 downward to the second item. After a predetermined button is pressed, i.e. either the soft key OK or the numbered button "2" is pressed, the resource locator for the selection is transmitted to the server device 144 by the client module in mobile device 142 over the data capable mobile telephone network 140. In response to the selection, the server device 144 processes the request containing the selection, and in this embodiment, transmits another card deck to the mobile device 144. In FIG. 4C, the display screen 316 shows four menu items numbered consecutively. As described above, the showing of the downward arrow indicates that there are more items in the next screen. Each of the items has its own address or URL, for example, for the first four items, the respective addresses may be:

www.abc.com www.xyzinfo.com www.financialinfo.com www.personalweb.com

Figure 4D:
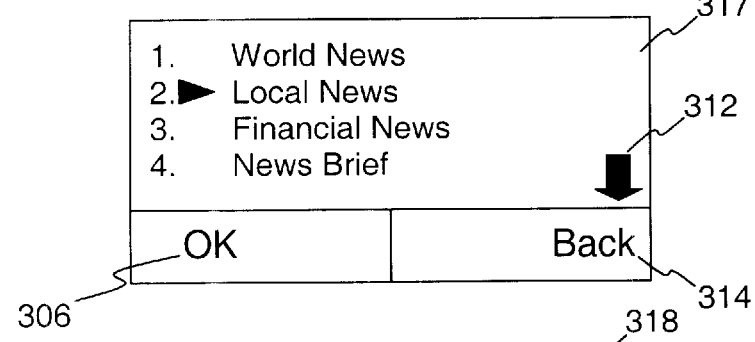

When the second item is chosen, the address www.xyzinfo.com is equivalently chosen. The client module 146 in the mobile device 142 establishes a connection to the server that hosts the web site addressed by www.xyzinfo.com. The server sends a new deck to the phone 100. The client module in mobile device 142 interprets the first card in the received deck from the server device 144, which is a choice card, and generates a screen display 317, that includes a second menu in a screen display 317 indicated by the downward arrow 312 as illustrated in FIG. 4D. As described above, the newly received deck is preferably stored in the cache memory, thus the subsequent navigation takes place within the deck.

As described above, the screen display 317 also includes the representations of two soft keys, an OK key 306, and a Back key 314. In this example, these soft keys are defined only for the card used to generate screen display 317. The "OK" key allows the user to proceed with the chosen item and the "Back" soft key allows the user to go back the previous card if so desired. Other keys can be implemented, for example a "Home" key to allow the user to go back to the first page 308. The "Home" key is associated with a pointer, that in one embodiment is a resource locator, and the card addressed by the pointer is displayed by the client module when the "Home" key is selected by the user. Specifically, if the pointer is to a card in the current deck, the client module simply displays that card. If the pointer is to other than a card in the current deck, the client module in mobile device 142 retrieves the deck containing the card at the location identified by the pointer. The location could be, for example, either a memory in the mobile device 142, or a memory in the server device 144.

Figure 5:
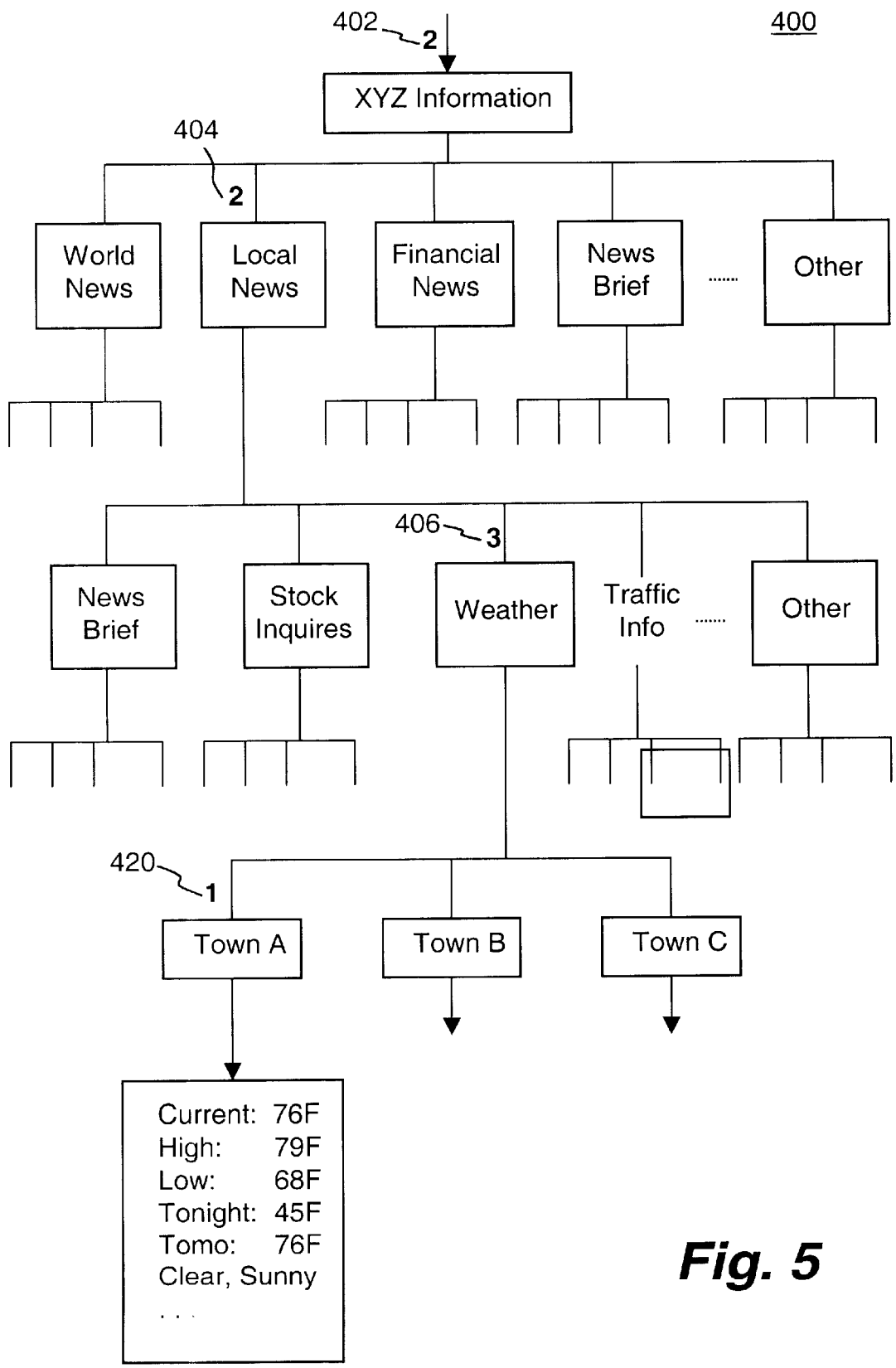
FIG. 5 illustrates tree structure of the information service provided by the web service hosted in the server device of FIG. 3.

In this example, the second item corresponds to an information Web site that is named "XYZ information". The Web site is configured to have a downward tree structure 400 of information services as shown in FIG. 5 in which the entry 402 must be passed through in order to access pertinent information in the tree structure 400. Generally the tree structured information is hosted in a server device maintained and updated by a service provider and the entry 402 is designated by an address identifier, such as a URL expressed in the form of www.xyzinfo.com. According to the present example, the entry 402 contains a number of hyperlinkable nodes linking to other text pages that further contains a number hyperlinkable nodes. Like tree branches, the structure 400 ends with leaves that are text pages or display cards. It is understood to those skilled in the art that each hyperlinkable node has its own address. For example, a node "Weather" 406 under its parent node "Local News" may have the address:

www.xyzinfo.com/LocalNews/Weather

One of the final leaves along the node "Weather" 406 is a page 420 that provides weather information in Town A and also addressed as www.xyzinfo.com/LocalNews/Weather/TownA/data According to the tree structure 400, a path along the nodes "2" 402, "2" 404, "3" 406 and "1" 420, i.e. "2231", will lead to the page that contains weather information in Town A if it is what is interested in. To pass through the first node "2" 402 is equivalent to a first request made in FIG. 4C, the subsequent node passage through "2" and "3" are considered as intermediate requests that have to be navigated in order to satisfy the last or final request of "1".

Figure 4E:
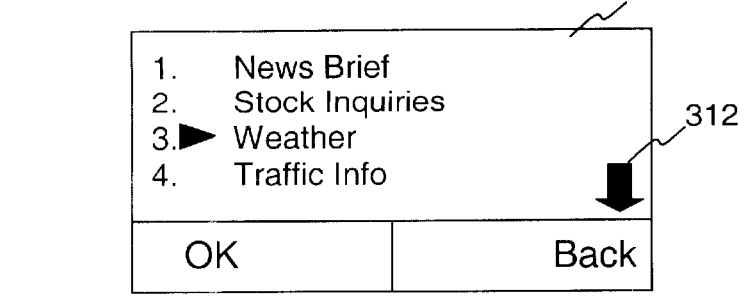
Figure 4F:
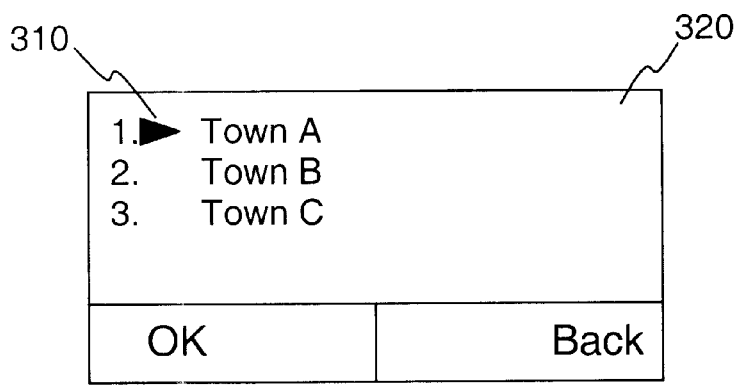
Figure 4G:
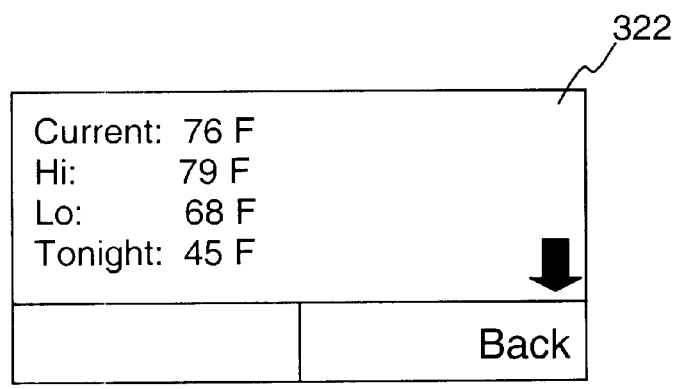

Referring to the screen display 318 in FIG. 4E which is another choice card that allows a user to further choose among a number of items, the downward arrow 312 indicates that it is a multi-screen card and there are more items that can be displayed if the downward arrow button is depressed. According to FIG. 4E, a user selects the third item "Weather", the client module in the phone 100 interprets the selection and displays a corresponding card that is designated by the third item in the figure. FIG. 4F shows a display screen 320 from the corresponding card that again is a choice card with three items, hence there is no downward arrow sign is shown therein. The weather page provides weather information of three different towns, Town A, Town B and Town C. If the user is interested in the weather information in Town A, the first item is indicated by the choice indicator 310 in the screen display 320. The process in the phone 142 interprets the selection from the user and returns a card that is a display card, resulting in a screen display 322, thereby the weather information in the display card is displayed.

The example shown in FIGS. 4A through 4G illustrates the steps of navigating an information service web site that generally provides hierarchic layers of information. To obtain pertinent information, the navigation process has to go through all the nodes on the way to the destined page. It is understood that the final page, i.e. the weather information in Town A, is what the user is interested in. Thus, in many systems, a user would need to laboriously navigate through hierarchies to obtain the final information. However, the present invention contemplates a system wherein the user does not have to view intermediate pages and enter intermediate requests sequentially that cause further intermediate pages to arrive in order to eventually get to a final page. Specifically, the present invention introduces a system wherein compound requests may be entered such that intermediate pages may be skipped in order to reach the destined page directly.

Figure 6A:
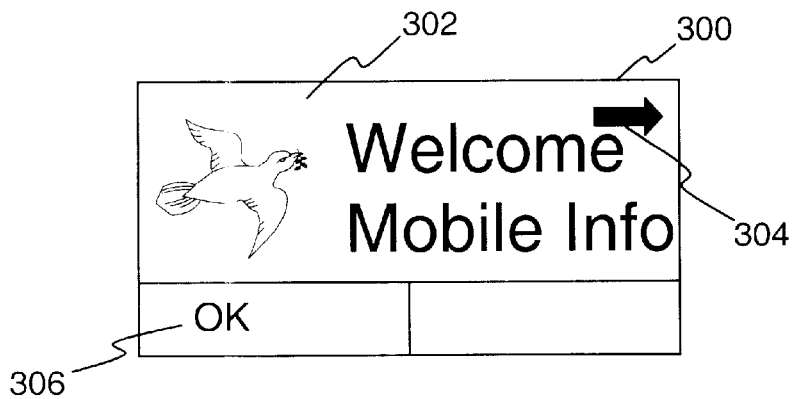
FIGS. 6A to 6C display respective screen displays after receiving a compound request.
Figure 6B:
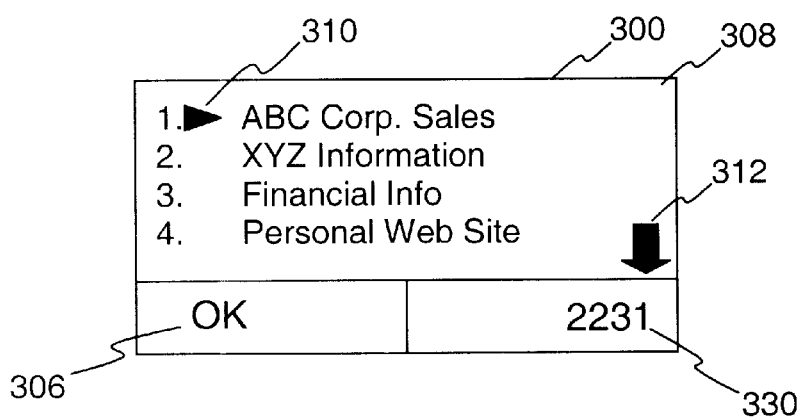
Figure 6C:
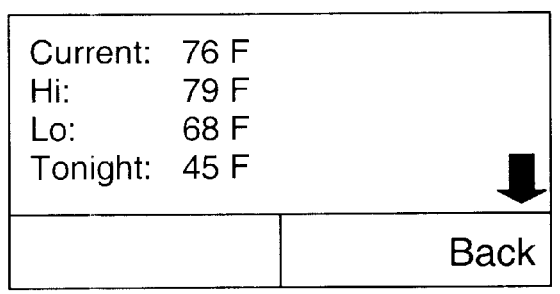

FIGS. 6A to 6C illustrate an example of quickly fetching a final page using compound requests. The example of FIGS. 6A to 6C parallels the example in FIGS. 4A to 4G to demonstrate a compound request comprising a plurality of individual requests.

Specifically, Instead of entering one selection or request in a choice card, a user can enter a sequence of requests. FIG. 6A replicates FIG. 4A for clarity and FIG. 6B shows the screen display 308 interpreted from a choice card after the user presses the soft key "OK" 306. As described above, the user may either choose an item by moving the arrow 310 downward or press one or more numbered keys with the first one corresponding to a choice item in the choice card screen display 308. To be more specific, the first numbered key pressed must correspond to one of the items in the display screen including those items in the next screen if the multiscreen indicator 312 is displayed. If the first request does not correspond to the item in the display screen, for example "9" being entered while there are less than 9 items in the display screen, the client module 146 in the mobile device 142 would be caused to look for a card that is not in existence in the deck received from the server device 144. It can be appreciated that there are preferably no more than nine items per display screen as the numerals "1" to "9", each corresponding to one item and "0" is reserved for the equivalence of the "Home" soft key.

To conform to the example in FIGS. 4A to 4G for clarity, a compound request "2231" is entered through the numbered keys in the keypad and echoed in the designated window 330 wherein "2" is the first request and thus must correspond to one item being in the display screen. The subsequent numerals "2" and "3" are the intermediate requests, each corresponding to an item in subsequent pages. "1" is the final request that also corresponds to an item in the last intermediate page and leads to the final page showing pertinent information in interest.

Upon pressing the "OK" soft key 306, the client module 146 examines if the request just entered is a compound request. As indicated above, a compound request is always more than one digit, proceeding with an antecedent request and following by a final request wherein the antecedent request may comprise a plurality of individual requests or intermediate requests. If the received request has one digit, the client module 146 processes the request as usual to activate a card that corresponds to the digit. If the client module 146 finds the received request has more than one digit, a parsing process is activated to parse the compound request into individual requests. Each individual request is respectively and sequentially processed as it was entered individually. It is understood to those skilled in the art that parsing the compound request can be readily implemented and embedded in the client module 146. However, the request could also be transmitted to the server and parsed by the server module. FIG. 6C shows that the final page having the pertinent information has been obtained by the compound request.

Figure 7:
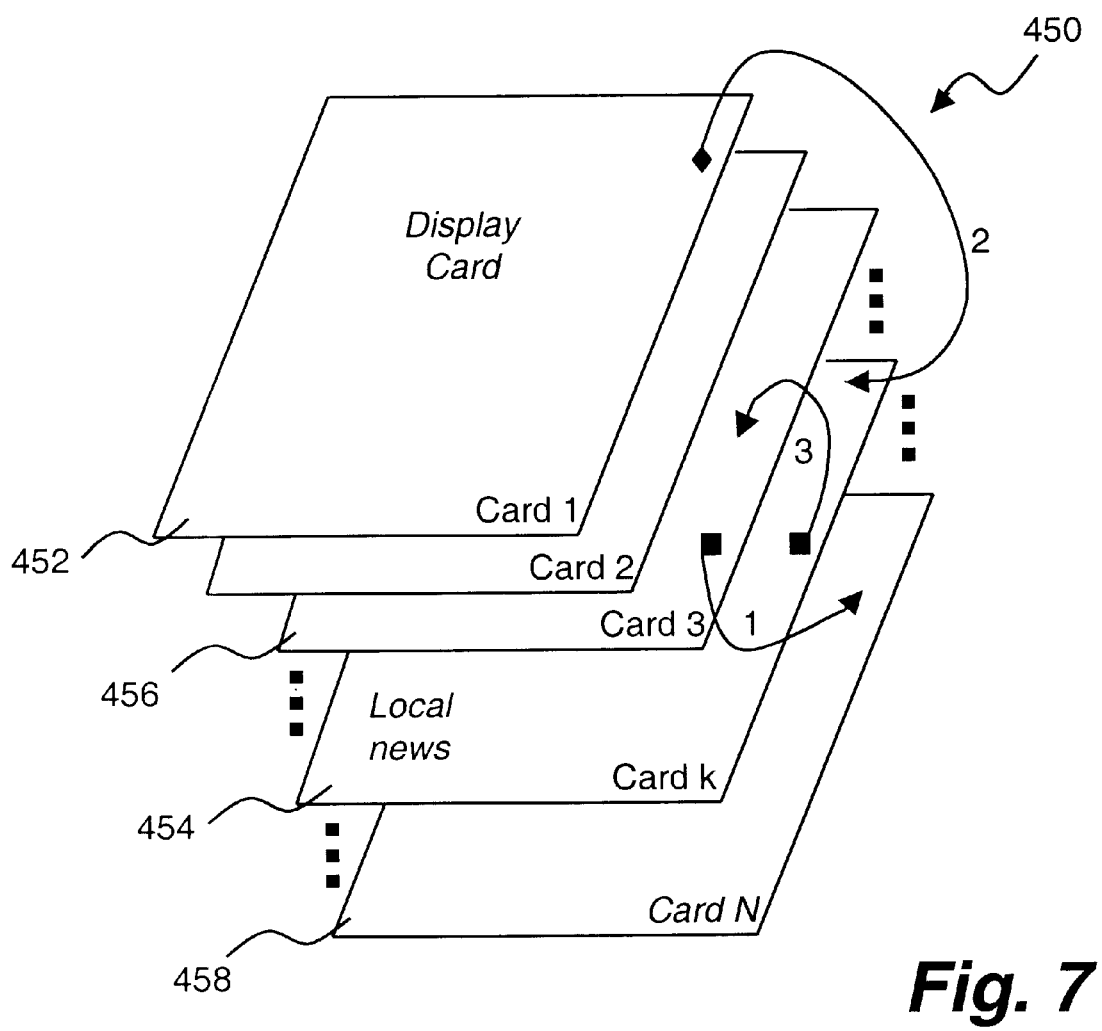
FIG. 7 demonstrates internal card transitions within a deck.
Figure 8:
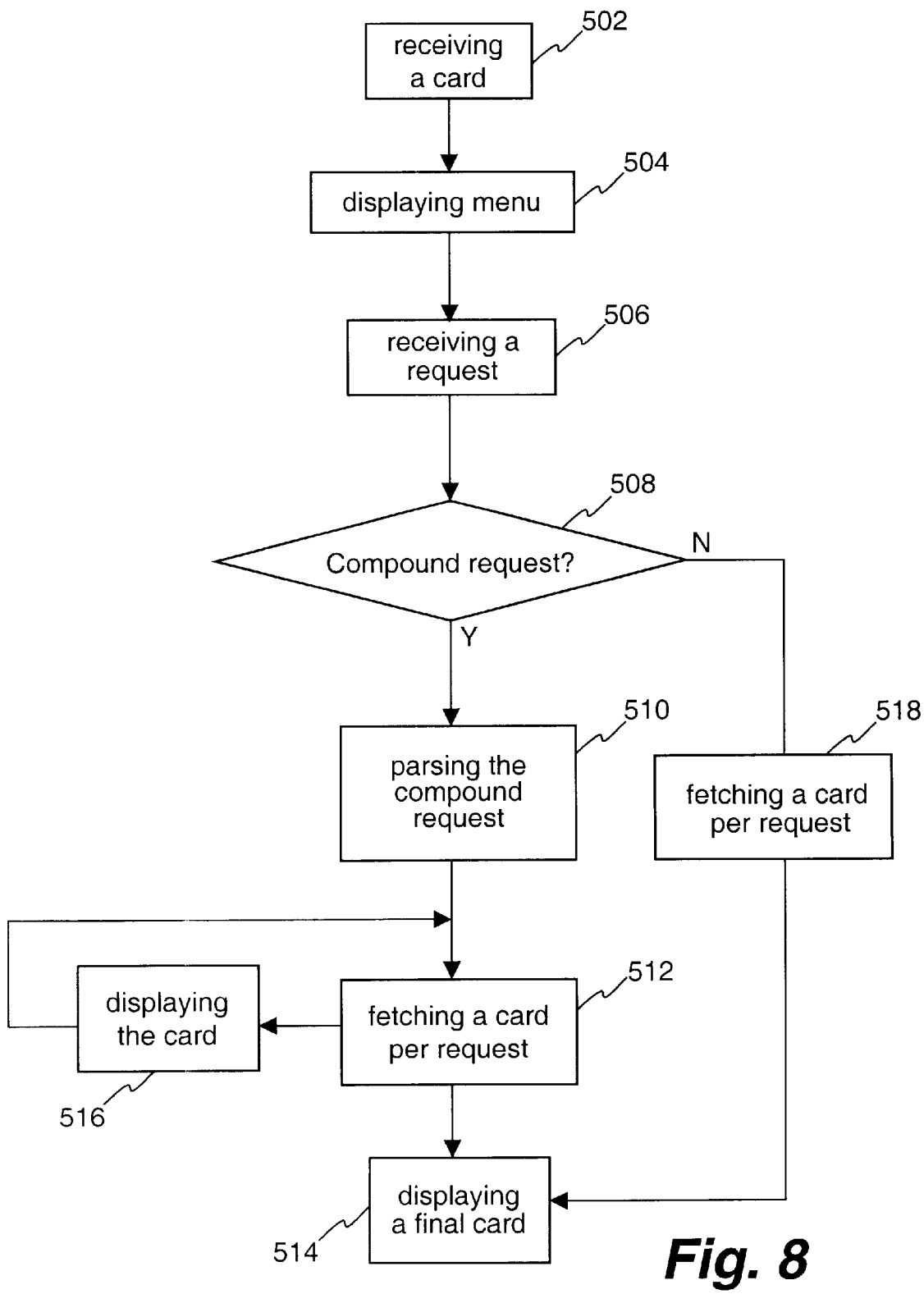
FIG. 8 depicts the process flow chart of a first embodiment of the system of the disclosed invention.

Two embodiments of a compound request processing have been investigated. FIG. 8 illustrates the compound request being processed by the client module 146 using a first embodiment and should be understood in conjunction with FIGS. 4A to 4G, FIGS. 6A to 6C and FIG. 7. The client module 146 processes the requesting using a deck received in the mobile device 142 as illustrated in FIG. 7. After the client module 146 parses the compound request "2231" into "2", "2", "3" and "1", each request is executed as if individually and successively entered in the embodiment of FIG. 8. The first "2" in the compound request is a request from the user to access the XYZ information Web in order to fetch the weather information in Town A. Referenced by 450 in FIG. 7, the deck is received accordingly from the server device 144 that hosts the XYZ information Web service in response to the first "2". Upon receiving the deck in the cache and activating the first display card 452, the following or intermediate request "2" is processed and causes a card transition from Card 1 to Card k, namely the client module 146 activates the corresponding card 454 (Card k) in the deck 450, which has the screen display in FIG. 4E. This card is displayed for a few seconds. The second immediate request "3" causes another card transition from Card k to Card 3, namely the client module 146 activates the corresponding card 456 (Card k) in the deck 450, which has the screen display in FIG. 4F. Thus, card 456 is displayed for a few seconds. The last request "1" further causes still another transition from Card 3 to Card N, namely the client module 146 activates the corresponding card 458 (Card N) in the deck 450, which has the screen display of FIG. 4G. It is additionally noted that cards 452, 454 and 456 are hypertext having linkages to other cards in the deck.

FIG. 8 shows a functional flowchart 500 that represents the processes and steps in the disclosed invention. At step 502, a card, typically a choice card, is received in the client device. It can be appreciated by now that either a card or a deck containing the card may have been received from a server device depending on what the client device is. If the client device is, for example, the mobile phone 120 in FIG. 2 that has a memory (cache) of sufficient capacity capable of receiving one or more decks, the server device normally sends multiple cards or decks so as to allow the client device to navigate the hypertext cards within the received deck or decks. The communication between a client device and a server device in the form of decks is referred to as the cache case hereinafter. If the client device has no sufficient memory (cache) to receive a deck, the server device can send individual card, which means a communication request is initiated ever time a card transition takes place in the client device. The communication between a client device and a server device in the form of one card is referred to as the cacheless case hereinafter.

Upon receiving the display card, the client module interprets it and causes it to be displayed at 504, which is typically a list of items with a designated display window to echo a request entered by the user via the keypad. At 506, a request is entered, i.e. one or more numerals are keyed in by depressing corresponding numbered buttons in the keypad and the numerals are displayed in the designated window for the user to sense the entry. At 508, the entered request is examined by the client module to determine if it is compound request. If the entered request is a single numeral, the request is processed as usual to activate a card that responds to the numeral. In the cache case, the card may be one of the cards in the deck received in the cache, resulting in a short response time to display the activated card. In the cacheless case, a connection to the server device is made to fetch a card, for example, from the HDML decks 154 in the server device 144 in FIG. 3. If the entered request is a compound request, a parsing process is activated to parse the compound request into individual requests, each is sequentially and respectively processed. In either case, a corresponding card is activated per each request at 512. As illustrated in FIGS. 4A to 4G, all the intermediate pages are displayed sequentially at 516 according to the compound request. When the final request is processed, the corresponding card containing desired information is displayed at 514. In the cacheless case, the client device sends the entered request, regardless of the types thereof, to the server device that has a similar parsing process to parse the compound request into individual requests. To minimize the air traffic and increase the response time, each of the individual requests is sequentially processed, fetching respective cards until the final request. When the final request is processed, a card corresponding to the final request is fetched from a linkage in the last intermediate card and the corresponding final card is then sent back to the client device for display, hence a user sees a desired display after a compound request is entered and activated.

Figure 9:
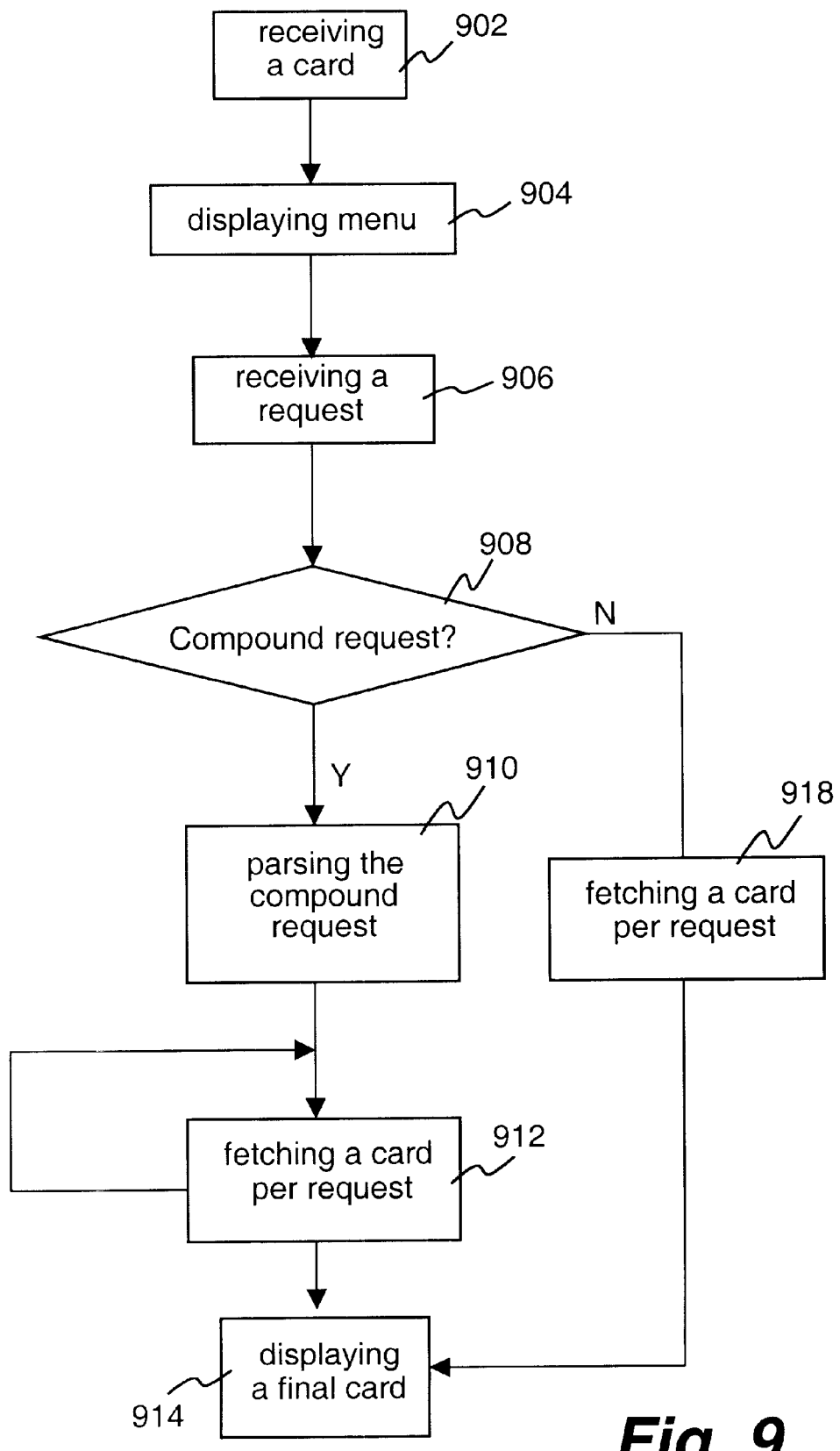
FIG. 9 illustrates an alternate embodiment of processing a compound request according to the teachings of the present invention.

FIG. 9 shows a flow diagram of an alternate method of processing compound requests. At step 902, a card, typically a choice card, is received in the client device. It can be appreciated by now that either a card or a deck containing the card may have been received from a server device depending on what the client device is. Upon receiving the display card, the client module interprets it and causes it to be displayed at 904, which is typically a list of items with a designated display window to echo a request entered by the user via the keypad. At 906, a request is entered, i.e. one or more numerals are keyed in by depressing corresponding numbered buttons in the keypad. At step 908, the entered request is examined by the client module to determine if the request is a compound request. If the entered request is a single numeral, the request is processed as usual to fetch a card that corresponds to the numeral at step 918. If the entered request is a compound request, a parsing process is activated to parse the compound request into individual requests, each is sequentially and respectively processed.

Specifically, a corresponding card is fetched per each intermediate request at step 912. In this second embodiment, no intermediate cards are displayed. When the final request is processed, the corresponding card containing desired information is displayed at 914.

The present invention has been described in sufficient detail with a certain degree of particularity. It is understood to those skilled in the art that the present disclosure of embodiments has been made by way of example only and that numerous changes in the arrangement and combination of parts as well as steps may be resorted without departing from the spirit and scope of the invention as claimed. Accordingly, the scope of the present invention is defined by the appended claims rather than the forgoing description of one embodiment.

What is claimed is:

1. A method for accelerating navigation of hierarchical layers of accessible information hosted in a server device through a two-way communication device over a data network, the method comprising:

receiving in said server device a compound request entered by a user of the two-way communication device to display desired information;

parsing said compound request in said server device to obtain an antecedent request and a final request;

processing the antecedent request and the final request to obtain a final address identifier;

fetching said desired information from a location indicated by said final address identifier; and transmitting said desired information to said two-way communication device.

2. The method as recited in claim 1 wherein the antecedent request comprises at least one intermediate request including a first intermediate request.

3. The method as recited in claim 2 wherein the first intermediate request corresponds to one of the items in a menu displayed on said two-way communication device.

4. The method as recited in claim 2 wherein said compound request comprises a sequence of numerals, a first numeral in the numeral sequence representing the first intermediate request, subsequent numerals in the numeral sequence each representing one of the intermediate requests respectively, and a final numeral in the numeral sequence representing said final request.

5. The method as recited in claim 3 wherein said menu has no more than 9 items.

6. The method as recited in claim 2 wherein the antecedent request and the final request processing comprises:

fetching intermediate cards according to said intermediate requests; and fetching, based on the intermediate cards, a final card according to said final request.

7. The method as recited in claim 6 further comprising:

parsing a first intermediate card with a subset of said compound request to identify a next intermediate card.

8. The method as recited in claim 6 further comprising:

parsing an intermediate card with a subset of said compound request to identify said final card.

9. The method as recited in claim 1 further comprising:

fetching an intermediate deck of cards from a card server coupled to said server device by a data network.

10. The method as recited in claim 6 further comprising:

receiving a final deck having a final card corresponding to said final request to said two-way communication device; and displaying said fin al card on the two-way communication device.

11. A server device for allowing a user of a two-way communication device to navigate through hierarchical layers of accessible information, said server device comprising:

an interface to a data network to receive in said server device a compound request entered by said user of said two-way communication device to display desired information;

a parser to parse said compound request in said server device to obtain an antecedent request and a final request;

a request processor to process the antecedent request and the final request to obtain a final address identifier; and a second interface to fetch said desired information from a location indicated by said final address identifier and to transmit said desired information to said two-way communication device.

12. The server device as recited in claim 11 wherein the antecedent request comprises at least one intermediate request including a first intermediate request.

13. The server device as recited in claim 12 wherein the first intermediate request corresponds to an item in a menu on said two-way communication device.

14. The server device as recited in claim 12 wherein the compound request comprises a sequence of numerals, a first numeral in the numeral sequence representing the first intermediate request, subsequent numerals in the numeral sequence each representing one of the intermediate requests respectively, and a final numeral in the numeral sequence representing the final request.

15. The server device as recited in claim 13 wherein said menu has no more than 9 items.

16. The server device as recited in claim 11 wherein said request processor fetches intermediate cards according to the intermediate requests and fetches a final card based upon final request.

17. The server device as recited in claim 16 wherein said request processor parses a first intermediate card with a subset of said compound request to identify a next intermediate card.

18. The server device as recited in claim 16 wherein said request processor parses an intermediate card with a subset of said compound request to identify said final card.

19. The server device as recited in claim 12 wherein said request processor fetches intermediate cards associated with said intermediate requests.

20. A computer readable medium, said computer readable medium containing a set of computer instructions that when executed cause a processing system to perform a process comprising:

receiving in a server device a compound request entered by a user of a two-way communication device to display desired information;

parsing said compound request in said server device to obtain an antecedent request and a final request;

processing the antecedent request and the final request to obtain a final address identifier;

fetching said desired information from a location indicated by said final address identifier; and transmitting said desired information to said two-way communication device.

21. The computer readable medium as recited in claim 20 wherein the antecedent request comprises at least one intermediate request including a first intermediate request.

22. The computer readable medium as recited in claim 21 wherein the first intermediate request corresponds to one of the items in a menu displayed on said two-way communication device.

23. The computer readable medium as recited in claim 21 wherein said compound request comprises a sequence of numerals, a first numeral in the numeral sequence representing the first intermediate request, subsequent numerals in the numeral sequence each representing one of the intermediate requests respectively, and a final numeral in the numeral sequence representing the final request.

24. The computer readable medium as recited in claim 22 wherein said menu has no more than 9 items.

25. The computer readable medium as recited in claim 21 wherein the antecedent request and the final request processing comprises:

fetching intermediate cards according to said intermediate requests; and fetching, based on the intermediate cards, a final card according to said final request.

26. The computer readable medium as recited in claim 25 further comprising:

parsing a first intermediate card with a subset of said compound request to identify a next intermediate card.

27. The computer readable medium as recited in claim 25 further comprising:

parsing an intermediate card with a subset of said compound request to identify said final card.

28. The computer readable medium as recited in claim 20 further comprising:

fetching an intermediate deck of cards from a card server coupled said server device by a data network.

29. The computer readable medium as recited in claim 25 further comprising:

receiving a final deck having a final card corresponding to said final request to said two-way communication device; and displaying said final card on the two-way communication device.

* * * * *

UNITED STATES PATENT AND TRADEMARK OFFICE
CERTIFICATE OF CORRECTION

| | | |
|---|---|---|
| PATENT NO. | : 6,526,439 B1 | Page 1 of 1 |
| APPLICATION NO. | : 09/539186 | |
| DATED | : February 25, 2003 | |
| INVENTOR(S) | : Alain S. Rossmann and Andrew L. Laursen | |

It is certified that error appears in the above-identified patent and that said Letters Patent is hereby corrected as shown below:

In the Specification

At Column 1, line 8, please correct as follows:

The present application is a continuation of U.S. Patent Application No. 09/025,961, filed February 19, 1998, now U.S. Patent No. 6,119,155, which is a continuation-in-part of U.S. Patent Application No. 08/570,210, filed on December 11, 1995 now U.S. Pat. No. 5,809,415, entitled "A Method and Architecture for An Interactive Two-way Data Communication Network" by Alain S. Rossmann, one of the inventors hereof. This copending application is incorporated herein by reference.

Signed and Sealed this
Sixteenth Day of September, 2014

Michelle K. Lee
*Deputy Director of the United States Patent and Trademark Office*